United States Patent [19]

Kihlstedt

[11] 3,725,032

[45] Apr. 3, 1973

[54] METHOD FOR AGGLOMERATING ORE CONCENTRATE AND RESULTANT PRODUCT

[75] Inventor: Per Gudmar Kihlstedt, Bromma, Sweden

[73] Assignee: AB Cold Bound Pellets, Djursholm, Sweden

[22] Filed: Dec. 16, 1969

[21] Appl. No.: 885,614

[30] Foreign Application Priority Data

Dec. 20, 1968 Sweden .............................. 17614/68

[52] U.S. Cl. .......................................... 75/3, 106/120
[51] Int. Cl. ............................................. C21b 1/24
[58] Field of Search ........................... 75/3; 106/120

[56] References Cited

UNITED STATES PATENTS

| | | | |
|---|---|---|---|
| 765,789 | 7/1904 | Peppel | 75/3 |
| 859,411 | 7/1907 | Schumacher | 75/3 |
| 862,666 | 8/1907 | Schumacher | 75/3 |
| 1,087,183 | 2/1914 | Ronay | 75/3 |
| 1,520,893 | 12/1924 | Teitsworth | 106/120 |
| 2,805,140 | 9/1957 | Schumacher | 75/3 |
| 2,884,320 | 4/1959 | Johnson | 75/3 |
| 3,235,371 | 2/1966 | Volin et al. | 75/3 |
| 3,257,220 | 6/1966 | Kalousek et al. | 106/120 |
| 3,386,816 | 6/1968 | English | 75/3 X |
| 3,505,439 | 4/1970 | Moorehead et al. | 106/120 X |
| 3,490,895 | 1/1970 | Svensson | 75/3 |

FOREIGN PATENTS OR APPLICATIONS 1,154,614    5/1969    Great Britain ............................. 75/3

*Primary Examiner*—Allen B. Curtis
*Attorney*—Fleit, Gipple & Jacobson

[57] ABSTRACT

A method for agglomerating finely-divided starting material containing at least one chemically bound metal which is to be reduced out in a metallurgical process in which there is used a slag whose silicon content is higher than that of the slag forming components of the starting material, wherein the starting material is mixed with a finely-divided binder, consisting mainly of silica, and the mixture is formed into agglomerates which are maintained for from 1 to 48 hours in an atmosphere consisting mainly of steam at a temperature of 160° – 230°C and a pressure of 10 – 70 atmospheres above atmospheric.

7 Claims, No Drawings

METHOD FOR AGGLOMERATING ORE CONCENTRATE AND RESULTANT PRODUCT

The present invention relates to a method for agglomerating finely-divided starting material containing at least one chemically bound metal which is to be reduced out in a metallurgical process in which there is used a slag whose silicon content is higher than that of the slag forming components of the starting material.

The normal procedure hitherto has been to form briquettes or pellets from finely-divided ore concentrate and similar metal containing starting materials and to sinter the briquettes or pellets by means of a suction sintering or pellet sintering process in which the agglomerates are heated to approximately 1,400° and 1,250°C, respectively. So-called cold binding processes have also been suggested, in which agglomerates are produced from the starting material, binding agent and water, and in which the agglomerates are treated with steam in a pressure autoclave which maintains a temperature of approximately 200°C and a pressure of approximately 20 atmospheres above atmospheric. In the cold binding process, which is effected at a temperature far below the sintering temperature of the substances present in the agglomerates, the agglomerates harden and so-called cold bound agglomerates are obtained provided that a suitable binding agent is used. Suitable binders are slaked lime, slaked steel furnace slag and cement, since these binders, either when used individually or in combination, are able to bind satisfactorily magnetite or hematite type iron ore concentrates, for example.

The normal binders, however, have been found unsuitable for use in producing cold bound agglomerates in such instances where the valuable metal in the agglomerates is to be reduced out in a metallurgical process in which there is used a slag whose silicon content is higher than that of the slag forming components of the starting material. Consequently, the cold bound agglomerates have made it necessary to add relatively large quantities of materials rich in silica together with the agglomerates, which may render the process of recovering the valuable metals present in the agglomerates more difficult, and in all events is economically disadvantageous owing to the increased volume of slag. When concerning the agglomeration of basic, and particularly ultra-basic ore concentrates and similar starting material, it has been impossible to obtain satisfactory cold binding when using the normal binding agents.

The object of the present invention is to circumvent the above-mentioned disadvantages and this is achieved by a method of the type defined in the introductory paragraph, wherein the starting material is mixed with a finely-divided or pulverulent binder, consisting essentially of silica, and the mixture is formed into agglomerates which are maintained for from 1 to 48 hours in an atmosphere consisting mainly of steam at a temperature of 160° – 230°C and a pressure of 10 – 70 atmospheres above atmospheric.

The starting material may suitably consist of an ore concentrate or a secondary product, such as a product returned from a separating system, for instance a dust separating product obtained when treating ore concentrate. For example, the ore concentrate may consist predominantly of iron oxides or of chrome iron ore. In accordance with another embodiment, the starting material may contain as a valuable component at least one of the metals Cu, Pb and Zn. Furthermore, the starting material may also contain a relatively high content of basic substances, for example basic gangue.

The binder used in the method of the invention and comprising mainly silica should preferably be relatively finely-divided. The binder should suitably present per gram a surface in excess of 3,000 cm$^2$. For example, the binder used may be finely-divided quartz which has been ground to a particle size of 80 percent by weight below 60 $\mu$m. Even more finely ground material can be used to advantage. Other finely-divided materials rich in silica, such as silica-rich slag may be used instead of the finely-divided quartz or in combination therewith. The binder may, to special advantage, consist at least partly of extremely finely-divided material comprising substantially silicon dioxide. Among such materials can be mentioned so-called silicon fume, which, as is generally known, is obtained by a portion of the silicon reduced out during the metallurgical manufacture of silicon iron being vaporized. The vaporized silicon departs from the furnace and burns to the form of an extremely finely-divided dust comprised mainly of silicon dioxide. This material, which has a particle size below 1 $\mu$m and which it has previously been impossible to use for any economical and useful purpose, can be used to great advantage as a binder in the method of the present invention. Other silica-rich dusts or powderous substances collected in air purifying filters within the metallurgical industry and also within the molding and mining industry, can be used to advantage as a binder in the method of the present invention. In certain instances the binder used in the method may be permitted to contain more or less alkaline material, such as slaked steel furnace slag, Portland cement and slaked lime. Thus, in addition to material rich in silica, hydraulic material may also be used as a binding agent, in such quantities that the agglomerates are caused to contain up to 20 percent by weight binder rich in silica and up to 10 percent by weight hydraulic binder. In other words, the binder can be composed of 67–100 percent silica and from 0–33 percent of a hydraulic material. Or to put it still another way, the binder may consist of up to one-third hydraulic material.

Normally the agglomerates are made to contain not more than 30 percent by weight binder, and usually they contain between 5 and 15 percent by weight binder. Thus, the agglomerates may contain about 70 to 95 percent iron ore fines.

The binder should be mixed intimately with the starting material. The resulting mixture is suitably subjected to a grinding operation, in order to further homogenize the mixture, whereby mechanochemical reactions which promote the subsequent cold binding of the agglomerate constituents and which increase the strength of the final agglomerates can be caused to take place. The mixture is formed in a moist state into agglomerates, which can either be in the form of briquettes of desired shape or in the form of pellets produced by rolling methods. These agglomerates, which are as yet not cold bound, often contain more water than is suitable for the subsequent treatment with steam at elevated pressure and elevated temperature, and in such cases the agglomerates may be pre-dried to the desired extend prior to said treatment. The agglomerates may be dried by passing the same along a slowly moving bed, e.g. a conveyor belt, and flushing them with hot air and/or heating the same by a radiation heater.

In accordance with one exemplary embodiment of the method of the invention ultra basic chromite ore having the following composition was agglomerated:

| | |
|---|---|
| $Cr_2O_3$ | 54.0% by weight |
| FeO | 15.7% " |
| $SiO_2$ | 2.65% " |
| MgO | 16.0% " |
| $Al_2O_3$ | 11.2% " |

The binding agent used as so-called silicon fume obtained from silicon iron manufacturing processes, containing approximately 90% $SiO_2$ in very finely-divided form. The chrome iron ore concentrate had a particle size distribution of approximately 80 percent by weight below 0.25 mm, and a third of this material was ground down to a particle size of 80 percent by weight below 0.10 mm, in order to facilitate pellet rolling and improve the compacting degree. A mixture of 60 percent by weight of the original chrome iron ore concentrate, 30 percent by weight according to the above additionally ground concentrate and 10 percent by weight silicon fume were ground and homogenized in wet state in a rod mill, whereafter the ground material was rolled into pellet form on a pelletizing plate, a suitable quantity of water for rolling purposes being supplied during the process. Subsequent to the pellet rolling operation, the pellets were flushed with hot air for 50 minutes as a preparatory measure prior to being treated in the autoclave and to impart to the pellets the necessary degree of moisture. The pellets were treated in a steam autoclave for 15 hours at 205°C and a pressure of 20 atmospheres above atmospheric. The obtained agglomerates presented excellent strength properties both in a cold state and during reduction in a hot state. The cold pressure strength for pellets having a diameter of 12 mm was in the order of 100 kp.

What is claimed is:

1. A process for agglomerating finely divided ferrous materials containing at least one chemically bound metal which is to be reduced out in a metallurgical process in which there is used a slag whose silicon content is higher than that of the slag forming components of the finely divided ferrous materials comprising:
    a. admixing said finely divided ferrous material with a binder consisting essentially of
        1. about 67 – 100 percent pulverulent silica having a specific surface area of at least 3,000 $cm^2$/gram and
        2. about 33 – 0 percent of a hydraulic material, the concentration of said binder in the composition being about 5 – 30 percent by weight,
    b. forming the composition into agglomerates, and
    c. heating said agglomerates for about 1 to 48 hours in a steam atmosphere at a temperature of about 160° to 230°C at a pressure of about 10 to 70 atmospheres above atmospheric.

2. A method as claimed in claim 1 characterized in that the silica binder is the silicon fume obtained from metallurgically manufacturing silicon iron, said silicon fume further characterized in that it contains extremely finely divided silicon dioxide.

3. A method as claimed in claim 1, characterized in that the binding agent contains up to one-third hydraulic material.

4. A method as claimed in claim 1, characterized in that the particulate ferrous material is chromium iron, iron ore or iron oxides.

5. A method as claimed in claim 1, characterized in that the particulate ferrous material contains copper, lead or zinc.

6. A method according to claim 1 wherein the binder comprises 30 percent by weight of the mixture.

7. The product of the process of claim 1.

* * * * *